(12) United States Patent
Kanzow et al.

(10) Patent No.: US 10,605,329 B2
(45) Date of Patent: Mar. 31, 2020

(54) DRIVE BELT

(71) Applicant: ContiTech Antriebssysteme GmbH, Hannover (DE)

(72) Inventors: Henning Kanzow, Wedemark (DE); Felicitas Broianigo, Hannover (DE); Reinhard Teves, Seelze (DE)

(73) Assignee: ContiTech Antriebssysteme GmbH, Hannover (DE)

( * ) Notice: Subject to any disclaimer, the term of this patent is extended or adjusted under 35 U.S.C. 154(b) by 313 days.

(21) Appl. No.: 15/890,038

(22) Filed: Feb. 6, 2018

(65) Prior Publication Data
US 2018/0156309 A1 Jun. 7, 2018

Related U.S. Application Data

(63) Continuation of application No. PCT/EP2016/060247, filed on May 9, 2016.

(30) Foreign Application Priority Data

Aug. 7, 2015 (DE) ........................ 10 2015 215 149

(51) Int. Cl.
| F16G 1/08 | (2006.01) |
| F16G 1/28 | (2006.01) |
| F16G 5/06 | (2006.01) |
| F16G 5/20 | (2006.01) |

(52) U.S. Cl.
CPC ................. *F16G 1/08* (2013.01); *F16G 1/28* (2013.01); *F16G 5/06* (2013.01); *F16G 5/20* (2013.01)

(58) Field of Classification Search
CPC ..... F16G 1/08; F16G 1/28; F16G 5/06; F16G 5/20
See application file for complete search history.

(56) References Cited

U.S. PATENT DOCUMENTS

| 9,695,906 B2 | 7/2017 | Brocke et al. |
| 10,041,194 B2 | 8/2018 | Furusawa |
| 2008/0121327 A1 | 5/2008 | Matsumura et al. |
| 2012/0115658 A1 | 5/2012 | Kanzow et al. |

FOREIGN PATENT DOCUMENTS

| CN | 101107395 A | 1/2008 |
| CN | 103608513 A | 2/2014 |
| WO | 2009066492 A1 | 5/2009 |
| WO | 2012143241 A1 | 10/2012 |

OTHER PUBLICATIONS

International Search Report dated Sep. 12, 2016 of international application PCT/EP2016/060247 on which this application is based.

*Primary Examiner* — Michael C Miggins
(74) *Attorney, Agent, or Firm* — David L. Cate; Gregory Adams

(57) ABSTRACT

A drive belt having a main body formed of an elastomeric material, preferably a v-belt or v-ribbed belt, the drive belt including a top layer as belt backing, a power transmission zone having two or more tensile strands as strength members, and also a substructure optionally provided with some profiling preferably having a v-shape or a v-rib profile. The strength members are formed of cords made of mutually twisted plies (final twist), the plies being in turn twisted out of individual yarns (first twist). The cords consist essentially of polyethylene terephthalate (PET) and of two plies, the number of turns introduced into the plies twisted into a cord (final twist) and the number of turns introduced into the yarns twisted into a ply (first twist) differing by not more than 10 turns per meter (t/m).

13 Claims, No Drawings

DRIVE BELT

CROSS REFERENCE TO RELATED APPLICATIONS

This application is a continuation application of international patent application PCT/EP2016/060247, filed May 9, 2016, designating the United States and claiming priority from German application 10 2015 215 149.2, filed Aug. 7, 2015, and the entire content of both applications is incorporated herein by reference.

FIELD OF THE INVENTION

The invention relates to a drive belt having a main body formed of an elastomeric material, preferably a v-belt or v-ribbed belt, the drive belt including a top layer as belt backing, a power transmission zone having two or more tensile strands as strength members, and also a substructure optionally provided some profiling, preferably having a v-shape or a v-rib profile, the strength members being formed of cords consisting of mutually twisted plies (final twist), the plies being in turn twisted out of individual yarns (first twist).

BACKGROUND OF THE INVENTION

The cord construction of a tensile strand is typically such that a number of filaments or fibers form a yarn and a group of one or more yarns form a so-called ply, and in turn a group of plies form a cord.

Drive belts may be constructed as flat belts, v-belts, v-ribbed belts, toothed belts and clutch belts. The v-ribbed belt (VRB) is of particular significance in the automotive sector, its primary function in vehicles being to drive auxiliary assemblies, as for instance to drive a cooling water pump of an air-conditioning compressor or an alternator. V-ribbed belts, as will be appreciated, are also used in customary domestic appliances, for example washing machines.

Yarn twist and cord twist refer respectively to the number of turns applied per meter to the fiber ensemble of a yarn and the folding twist applied to the plies as they are being twisted together to form a cord. This twist is needed to confer coherency on respectively the fiber ensemble and the ensemble of plies and to improve flex fatigue resistance. Twist may have an S-direction or a Z-direction.

The number of turns per meter (t/m) is determined per meter of length. The designation of a yarn as "300 Z", for example, is to be understood as meaning that the filaments of the yarn were twisted/spun at 300 turns per meter in the Z-direction.

V-ribbed belts in the automotive sector as well as most v-belts utilize mainly twisted cords of polyester as tensile strands. These cords are constructed from three, occasionally even from four or five twisted plies. The plies are first individually twisted from yarns consisting of filaments or fibers. This is the so-called "first twist". In a second step, the plies are gathered together and twisted into a cord in a direction contrary to the direction of twist of the plies. This is the final twist. If, therefore, the plies have been twisted in the S-direction, the cords will be twisted in the Z-direction. This balances the torsional force which remains in the elements as a result of twisting.

Usually, the number of turns (t/m) chosen for the first twist will be somewhat higher than for the final twist. Twisting the plies and the cords is a costly manufacturing step. The greater the number of plies making up a cord, the greater the amount of twisting that is required.

US 2012/0115658 A1, which is incorporated herein by reference, discloses a drive belt having a PET tensile strand having a linear density of more than 3600 dtex, for which 2-ply cords are also mentioned as a possibility. The first twist is done at ≥180 t/m and the final twist at ≤160 t/m. The power range in which such cords of low linear density are employable is but limited. They are overtaxed at a high rate of power transfer, for example to a comparatively large generator, the belts might fail as a result of cord uncoiling or as a result of excessive lengthening. In addition, twisting to high numbers of turns is costly.

WO 2012143241 A1, which is incorporated herein by reference, discloses inter alia an aramid cord having two plies with a first twist of 250 to 500 t/m and a final twist of 150 to 300 t/m. Aramid is a relatively costly material. In addition, the number of turns is very high, increasing the manufacturing costs.

SUMMARY OF THE INVENTION

It is an object of the present invention to provide a cord for a drive belt that is very inexpensive to fabricate and does not allow excessive lengthening in operation.

This object can, for example, be achieved by a drive belt having: a main body formed of an elastomeric material; a top layer configured as belt backing; the drive belt including a power transmission zone having two or more tensile strands as strength members; a substructure; the strength members being formed of cords having mutually twisted plies (final twist), the plies being in turn twisted out of individual yarns (first twist); and, the cords consisting essentially of polyethylene terephthalate (PET) and of two plies, a number of turns introduced into the plies twisted into a cord (final twist) and the number of turns introduced into the yarns twisted into a ply (first twist) differing by not more than 10 turns per meter (t/m).

Here the cords consist essentially of polyethylene terephthalate (PET) and of merely two plies, the number of turns introduced into the plies twisted into a cord (final twist) and the number of turns introduced into the yarns twisted into a ply (first twist) differing by not more than 10 turns per meter (t/m). An advantage with this invention configuration is that the number of turns is distinctly reduced as compared with the customary 3-ply cords. In addition, configurations according to the invention allow the use of so-called "direct-cabling machines", which make it possible to twist the plies and the cord in one operation.

DESCRIPTION OF THE PREFERRED EMBODIMENTS OF THE INVENTION

In an advantageous embodiment, the number of turns is between 60 and 175 t/m, preferably between 90 and 140 t/m. The advantage of this embodiment consists in imparting as many turns as are needed for the intended use. However, the choice of final twist should not be too low, or the cuttability of the cords degrades.

In a further advantageous embodiment, the cords have a linear density (total linear density) of from 3650 to 9000 dtex, especially from 6200 to 7000 dtex. A linear density at this level gives the best results for the abovementioned uses in the automotive sector and is obtainable at acceptable cost.

In a further advantageous embodiment, the cords have been drawn/preoriented such that the shrinkage of the cords at 150° C. is greater than 2% and the shrink force is between 0.0018 and 0.0051 N/dtex, preferably between 0.0022 and 0.0038 N/dtex. The effect of such an embodiment is that the cords scarcely lengthen in service.

The hot-shrink force and the hot shrinkage are determined in oil.

To determine the hot-shrink force, a cord is tensioned, along a length of 800 mm at a pre-load of 0.2 cN/tex of the total linear density, between two stationary clamps and then immersed for 3 min in a hot bath at 150° C. and then the developing shrink force is determined. In the case of an 1100×2×3 dtex cord, the pre-load amounts to 132 cN, that is, 1.3 N.

To determine the hot shrink or shrinkage, a cord is firmly clamped at one end and put under a constant pre-load of 0.2 cN/tex of the total linear density at the other end. An 800 mm sector of the cord tensioned with the pre-load is immersed for 3 min in a hot bath of 150° C. and the shrinkage of the cord at the pre-tension mentioned is determined.

In a further advantageous embodiment to improve the cuttability of the cords, the cord has been subjected to a stiffening treatment with isocyanates or blocked isocyanates.

In a further advantageous embodiment, the drive belt consists of peroxidically crosslinked EPDM or EPM. These materials are notable for high thermal stability and therefore will embrittle less and thereby attain a very high level of abrasion resistance.

In a further advantageous embodiment, the cord comprises not less than 80% of the cylindrical cord plane, that is, the proportion of the gaps between the cords/cord coils amounts to less than 20% of the cylinder area defined by the cord plane. Such an embodiment prevents the cords developing any uncoiling tendency in the event of a high or excessive load.

The example described hereinafter shows a v-ribbed belt configured according to the present invention. To this end, a "direct-cabling machine", which makes it possible to twist the plies and the cord in one operation, was used to produce a directly cabled PET cord having the construction 3300 dtex×2 (125/125 t/m) having a shrinkage force of 21 N (0.0032 N/dtex), and the cord was vulcanized into a V-ribbed belt whose mixture consisted of peroxidically crosslinked EPDM. Using a direct-cabling machine, which makes it possible to twist the plies and the cord in one operation, improves the economics of cord production.

This v-ribbed belt thus constructed was tested to a standard catalog of specifications. Absolutely no disadvantages were found versus v-ribbed belts having tensile strands of cords having a larger number of plies. The drive belt constructed according to the invention behaved no different from the drive belt having standard cords 1100 dtex×2×3 (150/125 t/m) with a hot-shrink force of 20 N, which is twisted together conventionally.

It is understood that the foregoing description is that of the preferred embodiments of the invention and that various changes and modifications may be made thereto without departing from the spirit and scope of the invention as defined in the appended claims.

What is claimed is:

1. A drive belt comprising:
a main body formed of an elastomeric material;
a top layer configured as belt backing;
the drive belt including a power transmission zone having two or more tensile strands as strength members;
a substructure;
said strength members being formed of cords having mutually twisted plies (final twist), said plies being in turn twisted out of individual yarns (first twist); and,
said cords consisting essentially of polyethylene terephthalate (PET) and of two plies, a number of turns introduced into the plies twisted into a cord (final twist) and the number of turns introduced into the yarns twisted into a ply (first twist) differing by not more than 10 turns per meter (t/m).

2. The drive belt of claim 1, wherein said number of turns is between 60 and 175 t/m.

3. The drive belt of claim 1, wherein said number of turns is between 90 and 140 t/m.

4. The drive belt of claim 1, wherein said cords have a linear density (total linear density) from 3650 to 9000 dtex.

5. The drive belt of claim 1, wherein said cords have a linear density (total linear density) from 6200 to 7000 dtex.

6. The drive belt of claim 1, wherein the cords have been drawn/preoriented such that the shrinkage of the cords at 150° C. is greater than 2% and the shrink force is between 0.0018 and 0.0051 N/dtex.

7. The drive belt of claim 1, wherein said cords have been drawn/preoriented such that the shrinkage of the cords at 150° C. is greater than 2% and the shrink force is between 0.0022 and 0.0038 N/dtex.

8. The drive belt of claim 1, wherein a cord s has been subjected to a stiffening treatment with at least one of isocyanates and blocked isocyanates.

9. The drive belt of claim 1, wherein said elastomeric material consists of peroxidically crosslinked EPDM or EPM.

10. The drive belt of claim 1, wherein:
said cords define a cord plane; and,
said cords comprise not less than 80% of said cylindrical cord plane.

11. The drive belt of claim 1, wherein the drive belt is a v-belt or a v-ribbed belt.

12. The drive belt of claim 1, wherein said substructure is provided with profiling.

13. The drive belt of claim 12, wherein said substructure has a v-shape or a v-rib profile.

* * * * *